(12) United States Patent
Taagepera (10) Patent No.: US 9,757,663 B2
(45) Date of Patent: Sep. 12, 2017

(54) CURVED LIQUID COLLECTOR TRAYS USEFUL IN PRESSURE VESSELS

(71) Applicant: Chevron U.S.A. Inc., San Ramon, CA (US)

(72) Inventor: Jaan Taagepera, Benicia, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 11 days.

(21) Appl. No.: 14/928,142

(22) Filed: Oct. 30, 2015

(65) Prior Publication Data

US 2017/0120162 A1 May 4, 2017

(51) Int. Cl.
*B01F 3/04* (2006.01)
*B01D 3/32* (2006.01)
*B01D 3/20* (2006.01)

(52) U.S. Cl.
CPC ............. *B01D 3/324* (2013.01); *B01D 3/20* (2013.01)

(58) Field of Classification Search
CPC . B01D 3/008; B01D 3/20; B01D 3/24; B01D 3/324; B01D 5/009; B01D 53/185
USPC ............. 261/97, 110, 114.1, 114.2, 114.5
See application file for complete search history.

(56) References Cited

U.S. PATENT DOCUMENTS

| | | | |
|---|---|---|---|
| 3,259,380 A * | 7/1966 | Brown | B01D 3/18 261/97 |
| 4,140,212 A * | 2/1979 | O'Blasny | B01D 3/00 196/114 |
| 4,427,605 A * | 1/1984 | Meier | B01D 3/20 202/158 |
| 5,118,449 A | 6/1992 | Wade et al. | |
| 5,132,055 A * | 7/1992 | Alleaume | B01D 3/008 261/114.5 |
| 5,147,584 A | 9/1992 | Binkley et al. | |
| 5,277,848 A | 1/1994 | Binkley et al. | |
| 5,338,517 A * | 8/1994 | Evans, III | B01D 3/009 203/DIG. 6 |
| 5,547,617 A | 8/1996 | Lee et al. | |
| 5,702,647 A | 12/1997 | Lee et al. | |
| 5,762,668 A * | 6/1998 | Lee | B01D 3/16 261/114.1 |
| 7,118,654 B2 * | 10/2006 | Hammon | B01D 3/24 202/110 |
| 8,118,284 B2 * | 2/2012 | Alzner | B01D 3/008 261/114.1 |
| 8,517,354 B1 | 8/2013 | Binkley | |
| 8,540,218 B2 | 9/2013 | Binkley et al. | |
| 9,360,252 B2 * | 6/2016 | Furlong | B01D 53/263 |
| 2008/0277260 A1 | 11/2008 | Binkley et al. | |
| 2010/0288624 A1 | 11/2010 | Kim et al. | |
| 2012/0118399 A1 | 5/2012 | Binkley et al. | |
| 2012/0211347 A1 | 8/2012 | Kim et al. | |

\* cited by examiner

*Primary Examiner* — Charles Bushey
(74) *Attorney, Agent, or Firm* — Karen R. DiDomenicis (57) ABSTRACT

Disclosed is a collector tray for collecting liquid in a pressure vessel such as a distillation column. The collector tray includes a liquid collecting surface having a curved shape such that the liquid collecting surface is generally upwardly concave or upwardly convex, and includes at least one chimney through the collector tray. The collector tray can be formed by attaching a plurality of collector tray panels to one another to form the collector tray having the liquid collecting surface. Methods for installing the collector tray and retrofitting a pressure vessel are also disclosed.

11 Claims, 7 Drawing Sheets

CURVED LIQUID COLLECTOR TRAYS USEFUL IN PRESSURE VESSELS

FIELD

The present disclosure relates to liquid collector trays useful in pressure vessels such as distillation columns.

BACKGROUND

Figure 1A:
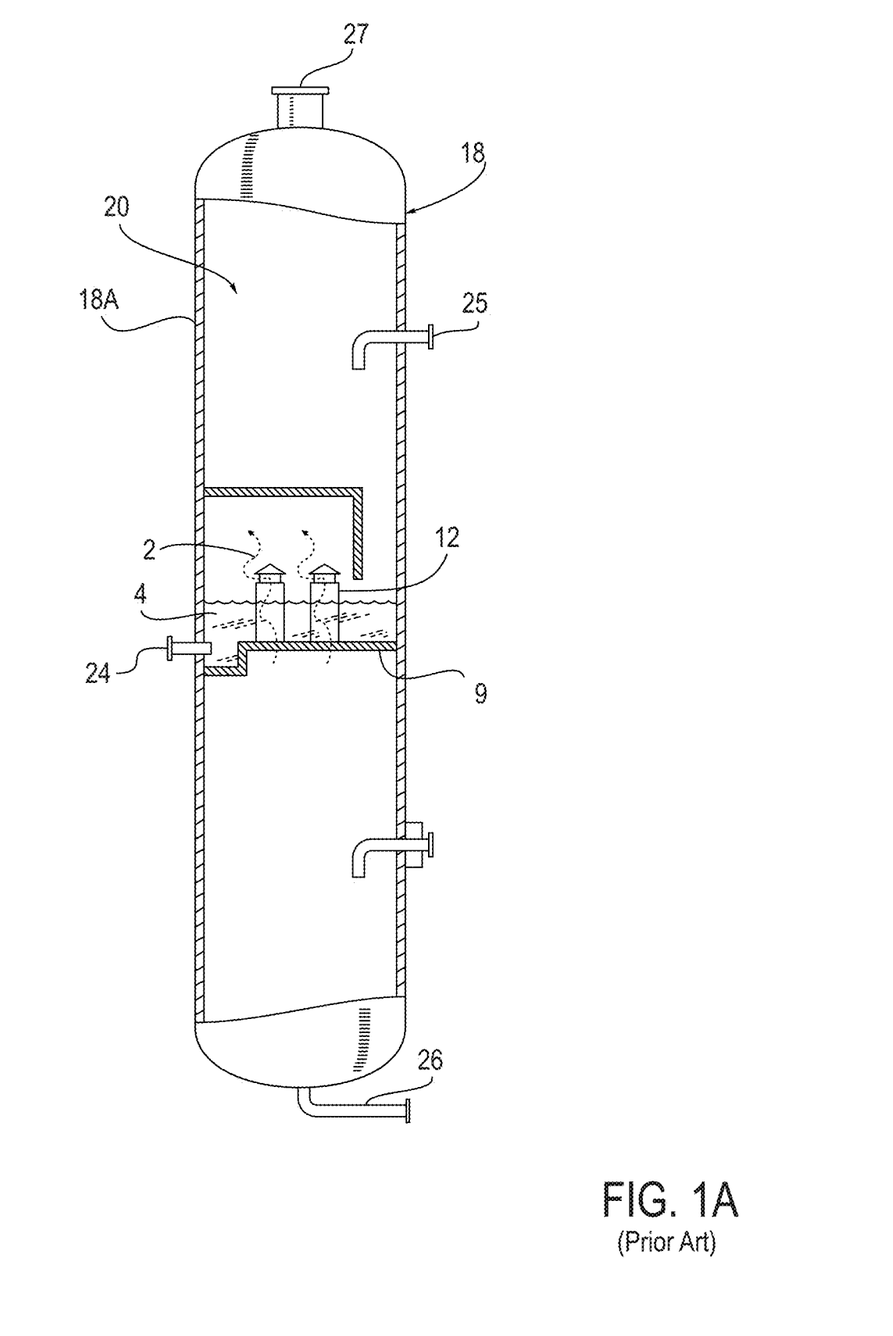
FIG. 1A is a cutaway drawing of a pressure vessel utilizing a chimney tray according to the prior art.
Figure 1B:
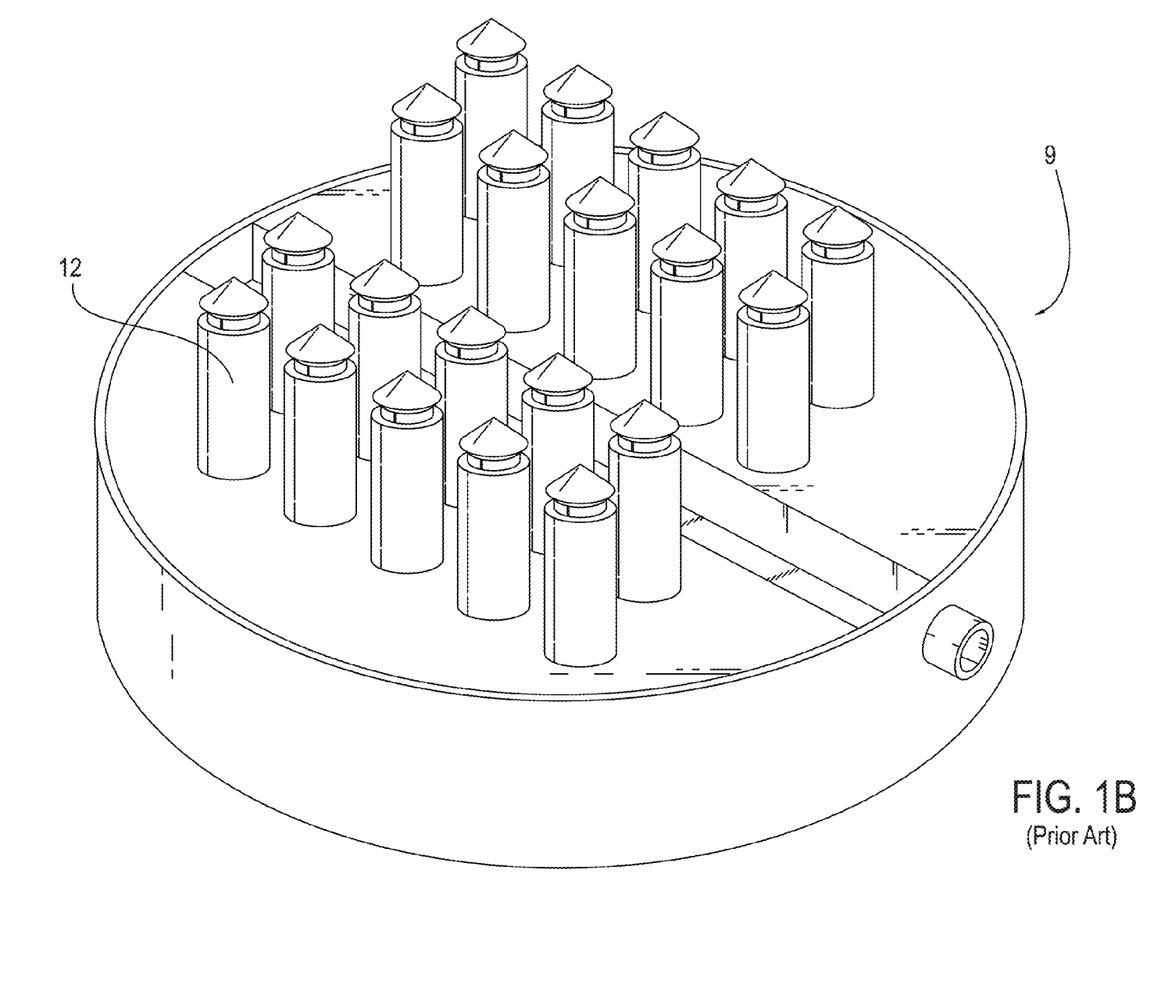
FIG. 1B is a perspective drawing of a chimney tray according to the prior art.

Liquid collector trays, also referred to simply as trays, are used in pressure vessels such as distillation columns in order to enhance fluid separation. One known type of liquid collector trays is the chimney tray, as shown in FIG. 1A and FIG. 1B. The chimney tray 9 is commonly used to draw off a liquid stream, e.g. a liquid intermediate product or a circulating reflux stream, from a nozzle 24 in a vessel 18. Alternatively, the chimney tray can be used to combine the liquid from above within the vessel with a liquid feed to the vessel. While the chimney tray 9 is collecting liquid 4, vapor 2 passes through a chimney riser 12 therein to the sections above. These trays are commonly built to withstand low loadings of applied forces and thus are subject to occasional overloads due to process upsets. Such overloading can cause substantial damage to vessel internals leading to degraded or lost processing functionality. For example, inadvertent introduction of water into a vessel is known to cause such damage when the water "flashes" to steam. When the water flowing through a pipe along with the oil is suddenly exposed to a hot, low pressure area, it flashes or expands rapidly, thereby creating the risk of physical damage to vessel internals.

The traditional approach to avoiding such damage, when elimination of the source of the overloading cannot be eliminated, is to make the trays more rugged. This is usually accomplished via the use of thicker tray panels and additional structural reinforcement.

There exists a need for a liquid collector tray and a pressure vessel utilizing the tray which would resist damage caused by excessive loading in a less costly way. It would further be desirable to have a lighter weight and/or more compact liquid collector tray.

SUMMARY

In one aspect, a collector tray useful for collecting liquid in a pressure vessel is provided. The collector tray includes a liquid collecting surface having a curved shape such that the liquid collecting surface is generally upwardly concave or upwardly convex, and includes at least one chimney through the collector tray. The collector tray can be formed by attaching a plurality of collector tray panels to one another to form the collector tray having the liquid collecting surface.

In another aspect, a pressure vessel is provided utilizing the collector tray. The pressure vessel can be a distillation column.

In another aspect, a method of installing at least one collector tray is provided in which the plurality of collector tray pieces are passed through an opening in the pressure vessel. The collector tray pieces are the attached to one another to form the collector tray in the pressure vessel. The collector tray is then supported by a vessel wall of the pressure vessel.

In another aspect, a method of retrofitting a pressure vessel having at least one existing substantially planar collector tray therein for collecting liquid is provided. The at least one existing substantially planar collector tray is removed from the pressure vessel. The at least one replacement collector tray having the curved liquid collecting surface is installed in the pressure vessel.

DESCRIPTION OF THE DRAWINGS

These and other objects, features and advantages of the present invention will become better understood with reference to the following description, appended claims and accompanying drawings where:

DETAILED DESCRIPTION

Figure 2A:
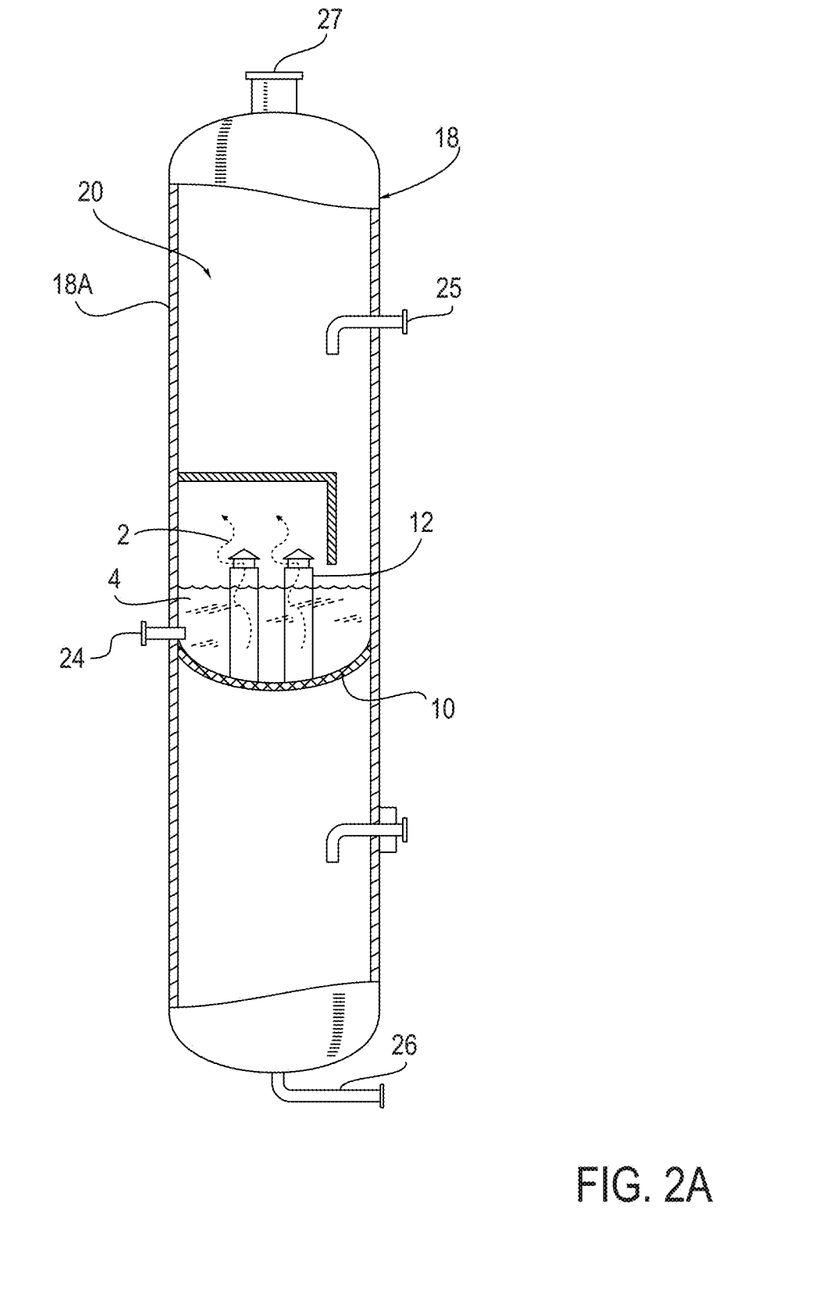
FIG. 2A is a cutaway drawing of a pressure vessel utilizing a collector tray according to one exemplary embodiment.
Figure 2B:
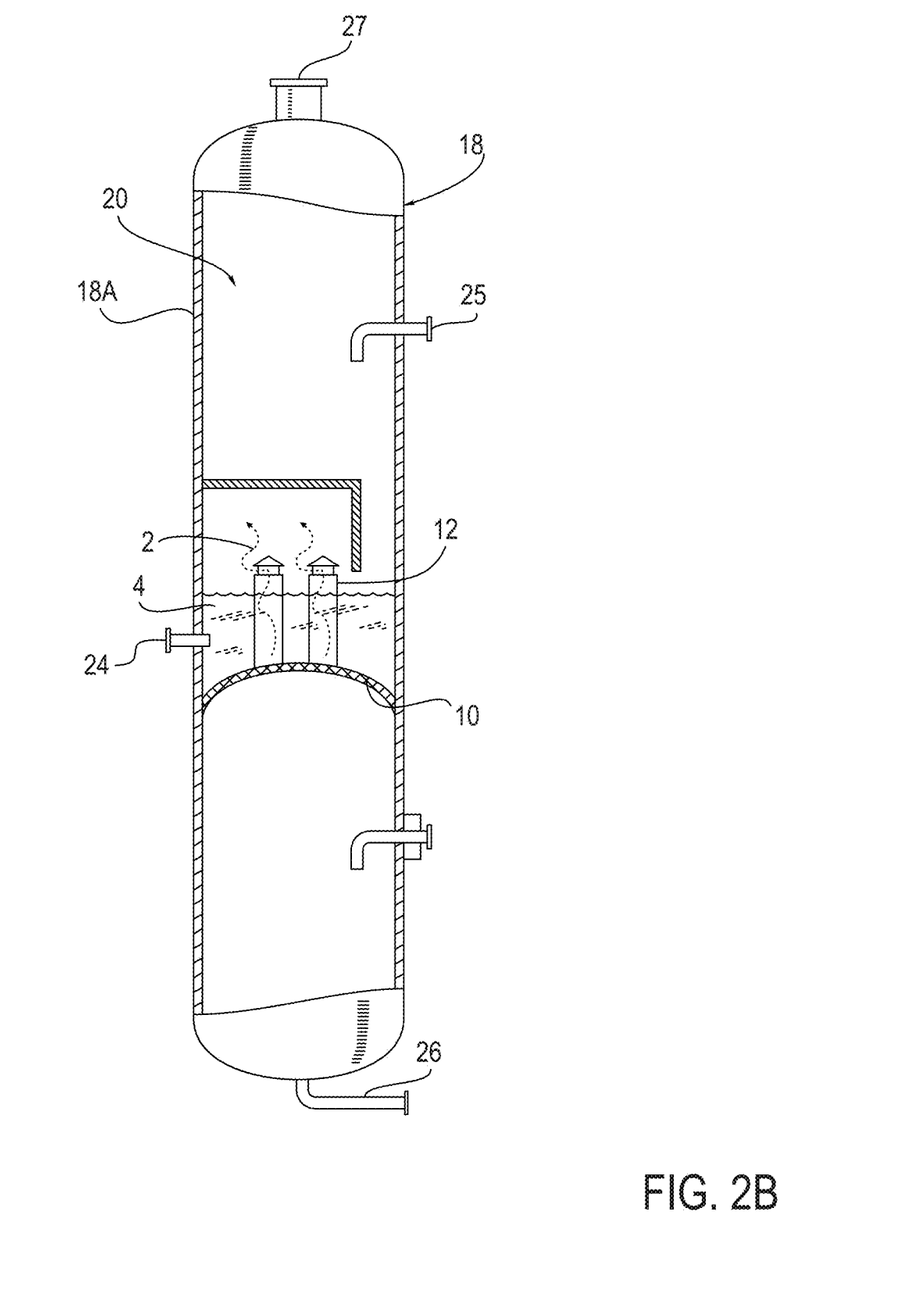
FIG. 2B is a cutaway drawing of a pressure vessel utilizing a collector tray according to another exemplary embodiment.

In one embodiment, a collector tray useful for collecting liquid in a pressure vessel is provided. Referring to FIG. 2A, a pressure vessel 18 has a vessel wall 18A, also referred to herein as a shell, containing an internal space 20. In one embodiment, the pressure vessel is a distillation column. The vessel 18 has one or more fluid inlets 25 for receiving liquid, a liquid outlet 26, a vapor outlet 27 and a draw-off nozzle 24. Positioned within the vessel wall 18A, and secured or attached there to, is at least one collector tray 10 for collecting liquid 4. The collector tray 10 has a liquid collecting surface having a curved shape. The curved liquid collecting surface can be generally upwardly concave as shown in FIG. 2A, or generally upwardly convex as shown in FIG. 2B. The collector tray 10 has at least one chimney also referred to as a chimney riser 12 for allowing vapor 2 to pass through the collector tray 10 while avoiding contact with the liquid 4 collected in the collector tray 10.

Figure 3A:
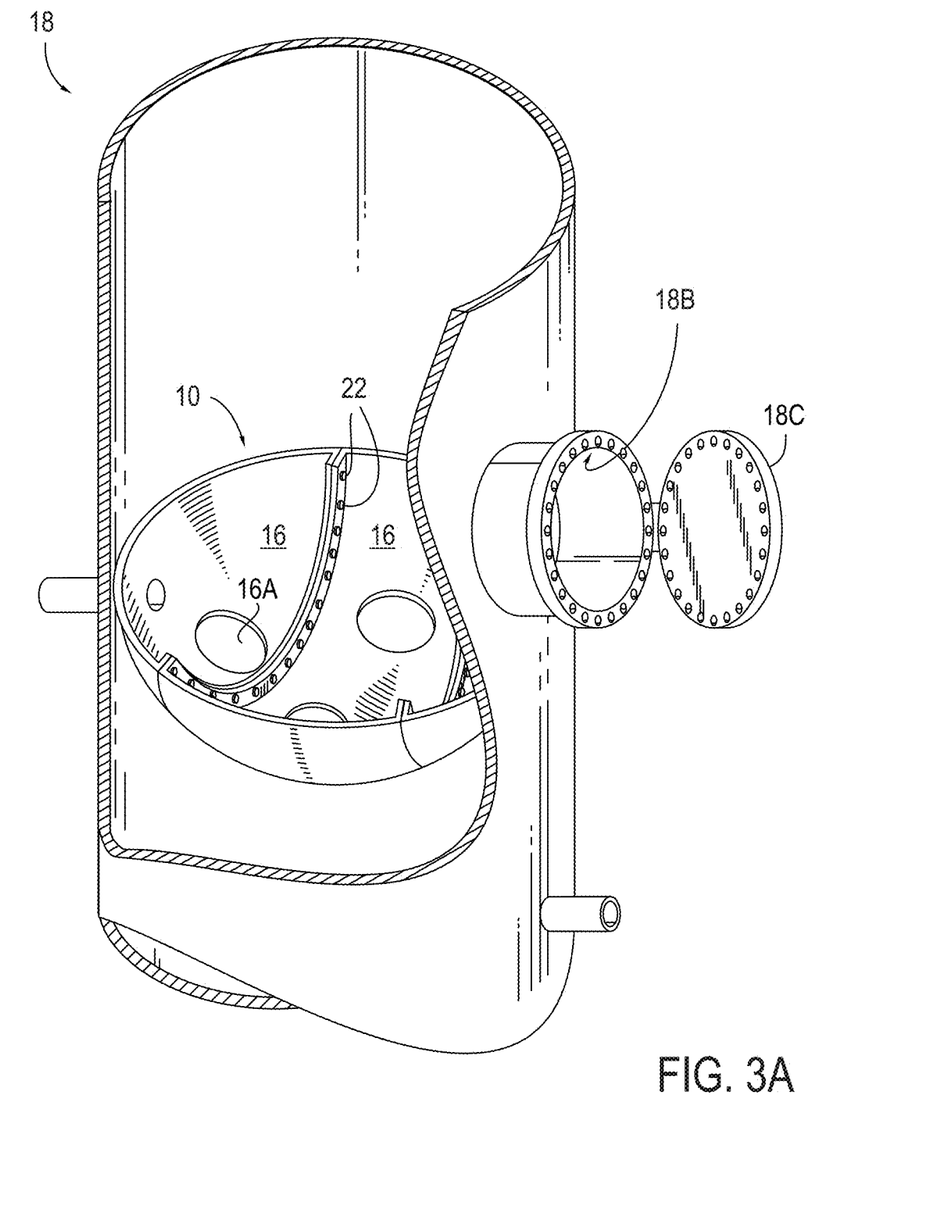
FIG. 3A is a cutaway perspective drawing of a collector tray in a pressure vessel according to one exemplary embodiment without the chimney risers shown.
Figure 3B:
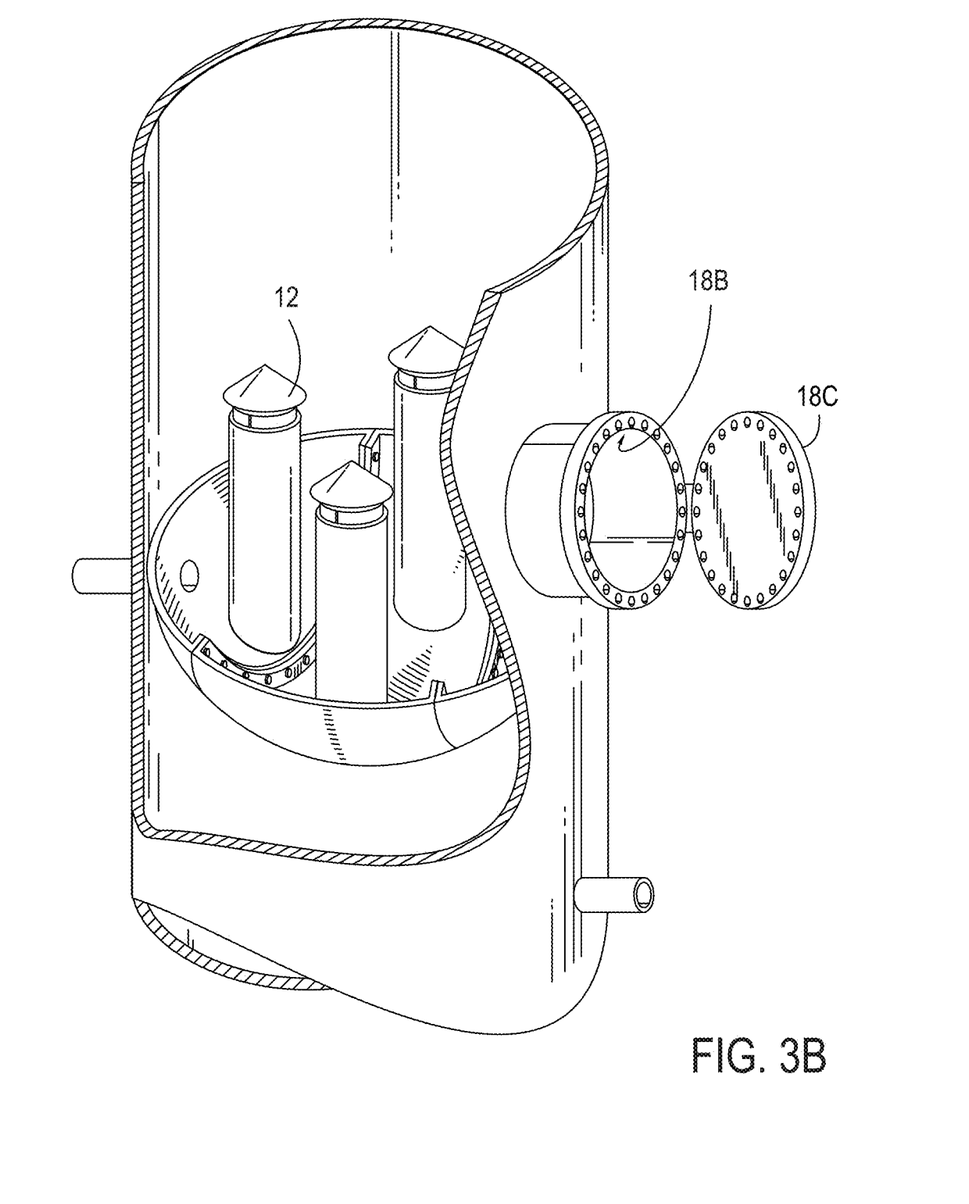
FIG. 3B is a cutaway perspective drawing of a collector tray in a pressure vessel according to one exemplary embodiment with the chimney risers shown.
Figure 3C:
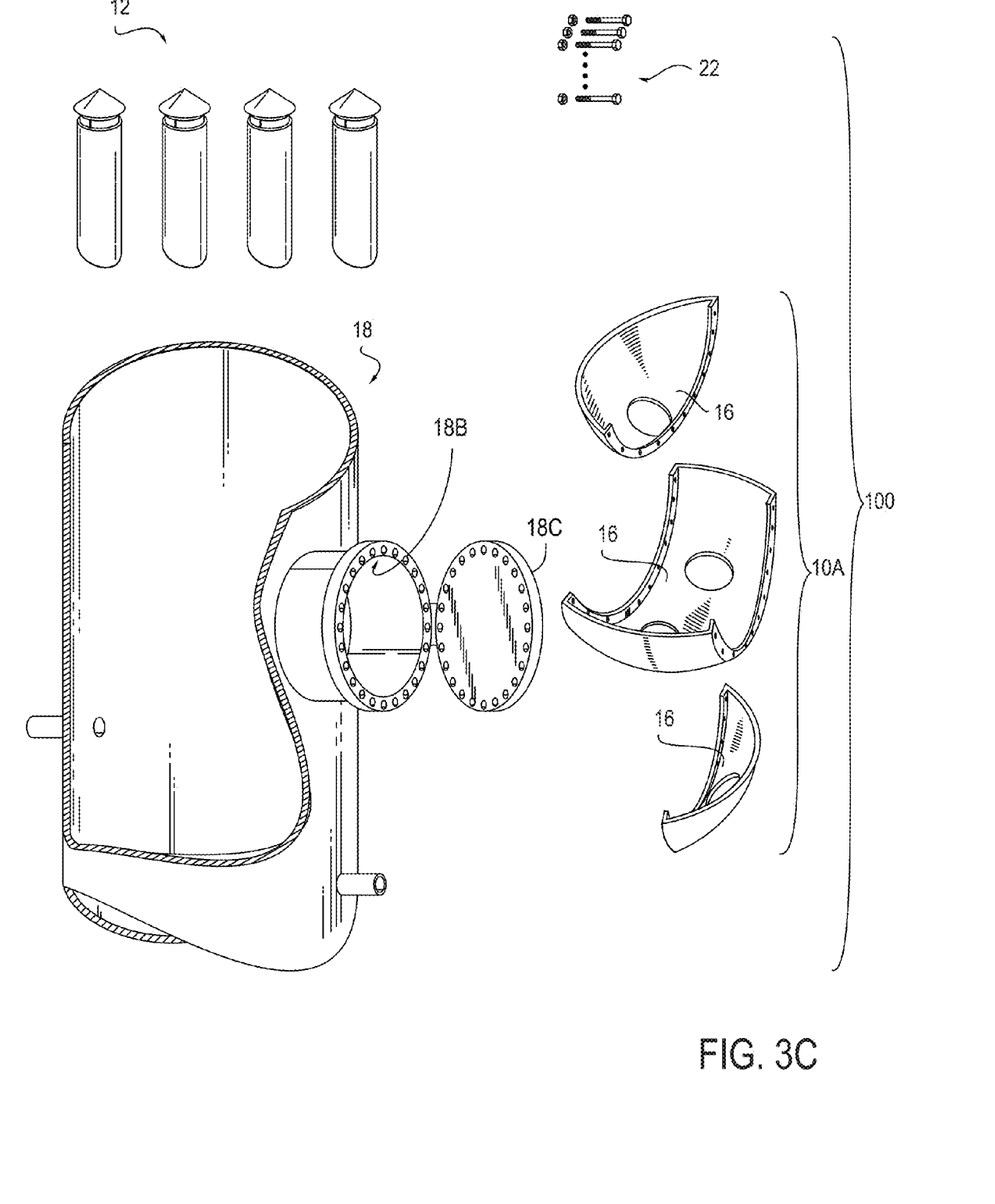
FIG. 3C is a cutaway perspective drawing of a method for installing a collector tray according to one exemplary embodiment in a pressure vessel.

In one embodiment, shown in FIGS. 3A-3C, the collector tray 10 is made up of multiple collector tray pieces 16, also referred to herein as tray panels. The collector tray pieces 16 are attachable to one another to form the collector tray 10. FIG. 3A shows the collector tray 10 without the chimney risers 12, so that openings 16A are visible. FIG. 3B shows the collector tray 10 with the chimney risers 12 in place.

Conveniently, the multiple collector tray pieces 16 can be passed through an opening 18B such as a manway in the pressure vessel wall 18A, the manway having a cover 18C. The collector tray pieces 16 can be attached to one another by bolts 22. In one embodiment, the collector tray 10 is made up of from three to 100 collector tray pieces 16. In one embodiment, the collector tray 10 is made up of from three to 50 collector tray pieces 16.

In one embodiment, a liquid draw off nozzle 24 is provided in the vessel wall 18A. In one example, the liquid draw off nozzle 24 is located proximate the collector tray 10 such that liquid 4 collected in the collector tray 10 can be removed from the pressure vessel 18 through the liquid draw off nozzle 24.

In one embodiment, the collector tray 10 is supported by tray support rings and fixed in place in a manner similar to conventional flat, planar panel trays. The tray support rings can be modified as necessary as would be apparent to one of ordinary skill in the art. The tray support ring can be a single piece or multiple pieces. The tray support ring can be welded to the vessel shell 18A. The collector tray 10 can then be placed onto the tray support ring. Trays for medium to large diameter vessels may require structural beams for support, in addition to or instead of the tray support ring. Such beams can be attached to the vessel shell 18A by bolting to clips welded to the shell or by being supported in "beam seats" which are welded to the shell. Alternatively, collector trays 10 can be welded directly to the shell 18A.

Referring to FIG. 3C, a method for installing a collector tray 10 in a pressure vessel 18 according to one embodiment will be described. In this embodiment, the components 100 including the set 10A of multiple collector tray pieces 16, the chimney risers 12 and the bolts 22 are passed through the opening 18B such as a manway in the pressure vessel wall 18A. Inside the vessel 18, the collector tray pieces 16 are attached to one another to form the collector tray 10 having the curved liquid collecting surface. The thus formed collector tray 10 can then be supported by the vessel wall 18A, either by supporting the assembled tray 10 upon tray support rings welded to the vessel wall 18A or by welding the assembled tray 10 directly to the vessel wall 18A.

In one embodiment, a method is provided for retrofitting a pressure vessel having at least one existing substantially planar collector tray, e.g. that shown in FIG. 1. The existing substantially planar collector tray is removed from the pressure vessel. In one embodiment, this existing substantially planar collector tray is made up of multiple tray panels which are disassembled within the vessel 18 and removed through the manway 18B. The collector tray 10 having the curved liquid collecting surface can then be installed. The collector tray 10 can be installed according to the method described above.

The collector tray 10 is more resistant to overpressure and excessive loads than known flat, substantially planar collector trays. Use of the collector tray 10 can enhance the inherent reliability of process columns with respect to incidents of inadvertent flashing of water.

The liquid collector tray 10 can be thinner and therefore lighter weight than conventional trays. Having lighter weight components typically results in lower cost in new construction. For post-construction applications, lighter weight components are generally safer and easier for workers to handle. Alternatively, panels with the same weight as conventional tray panels can be made larger, resulting in fewer joints between panels. This would advantageously reduce assembly time. The liquid collector tray 10 enables greater structural robustness without increasing weight, thus providing a more compact liquid collector tray. This is a benefit in the case of a vessel retrofit. In some cases there is not enough room to add properly sized structural beams to increase the strength of conventional flat panel trays.

It should be noted that only the components relevant to the disclosure are shown in the figures, and that many other components normally part of a pressure vessel are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent. Also, "comprise," "include" and its variants, are intended to be non-limiting, such that recitation of items in a list is not to the exclusion of other like items that may also be useful in the materials, compositions, methods and systems of this invention.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A collector tray useful for collecting liquid in a pressure vessel, the collector tray comprising:
   a. a curved liquid collecting surface is upwardly concave or upwardly convex; and
   b. at least one chimney through the curved liquid collecting surface for allowing vapor to pass through the collector tray while avoiding contact with the liquid collected in the collector tray.

2. The collector tray of claim 1, wherein the curved liquid collecting surface comprises a plurality of collector tray pieces configured to be attachable to one another to form the curved liquid collecting surface.

3. The collector tray of claim 2, wherein the plurality of collector tray pieces comprises from three to 100 collector tray pieces.

4. A pressure vessel comprising:
   a. a vessel wall containing an internal space;
   b. a collector tray positioned within the vessel wall for collecting liquid, comprising:
      i. a curved liquid collecting surface is upwardly concave or upwardly convex; and
      ii. at least one chimney through the curved liquid collecting surface for allowing vapor to pass through the collector tray while avoiding contact with the liquid collected in the collector tray; and
   c. a liquid draw off nozzle in the vessel wall.

5. The pressure vessel of claim 4, wherein the pressure vessel is a distillation column.

6. The pressure vessel of claim 4, wherein the liquid draw off nozzle in the vessel wall is located proximate the collector tray such that liquid collected in the collector tray can be removed from the pressure vessel through the liquid draw off nozzle.

7. A method of retrofitting a pressure vessel having at least one existing substantially planar collector tray therein for collecting liquid, comprising:
   a. removing the at least one existing substantially planar collector tray from the pressure vessel; and
   b. installing at least one collector tray according to claim 1 in the pressure vessel; wherein the installing includes supporting the at least one collector tray by a vessel wall of the pressure vessel.

8. A method of retrofitting a pressure vessel having at least one existing substantially planar collector tray therein for collecting liquid, comprising:
   a. removing the at least one existing substantially planar collector tray from the pressure vessel; and
   b. installing at least one collector tray according to claim 2 in the pressure vessel; wherein the installing includes:
      i. passing the plurality of collector tray pieces through an opening in the pressure vessel; and
      ii. attaching the plurality of collector tray pieces to one another to form the collector tray having the liquid collecting surface; and
      iii. supporting the collector tray formed by a vessel wall of the pressure vessel.

9. A method of installing at least one collector tray according to claim 2 in the pressure vessel, comprising:
   a. passing the plurality of collector tray pieces through an opening in the pressure vessel; and
   b. attaching the plurality of collector tray pieces to one another to form the collector tray having the liquid collecting surface; and
   c. supporting the collector tray formed by a vessel wall of the pressure vessel.

10. The method of claim 7, 8 or 9, wherein the collector tray is supported by the vessel wall of the pressure vessel by placing the collector tray on one or more tray support rings attached to the vessel wall.

11. The method of claim 7, 8 or 9, wherein the collector tray is supported by the vessel wall of the pressure vessel by directly welding the collector tray to the vessel wall.

* * * * *